(12) United States Patent
Venkataraman et al.

(10) Patent No.: US 10,621,507 B2
(45) Date of Patent: Apr. 14, 2020

(54) SYSTEM AND METHOD FOR GENERATING AN OPTIMIZED RESULT SET USING VECTOR BASED RELATIVE IMPORTANCE MEASURE

(71) Applicant: Wipro Limited, Bangalore (IN)

(72) Inventors: Arthi Venkataraman, Bangalore (IN); Samson Saju, Bangalore (IN); Tamilselvan Subramanian, Bangalore (IN)

(73) Assignee: Wipro Limited, Bangalore (IN)

( * ) Notice: Subject to any disclaimer, the term of this patent is extended or adjusted under 35 U.S.C. 154(b) by 1058 days.

(21) Appl. No.: 15/078,526

(22) Filed: Mar. 23, 2016

(65) Prior Publication Data

US 2017/0262449 A1  Sep. 14, 2017

(30) Foreign Application Priority Data

Mar. 12, 2016 (IN) .............................. 201641008692

(51) Int. Cl.
*G06N 20/00* (2019.01)
*G06F 16/332* (2019.01)
(Continued)

(52) U.S. Cl.
CPC ......... *G06N 20/00* (2019.01); *G06F 16/3325* (2019.01); *G06N 5/022* (2013.01); *G06N 5/048* (2013.01)

(58) Field of Classification Search
CPC ............................ G06N 20/00; G06F 16/3325
See application file for complete search history.

(56) References Cited

U.S. PATENT DOCUMENTS 5,384,894 A * 1/1995 Vassiliadis ................ G06F 8/20
706/52
5,675,819 A * 10/1997 Schuetze ............... G06F 17/274
704/10
(Continued)

FOREIGN PATENT DOCUMENTS

WO   WO 2014/098561 A1   6/2014

OTHER PUBLICATIONS

Yan et al. Improving Cross-Document Knowledge Discovery Using Explicit Semantic Analysis. Sep. 2012. (Year: 2012).*

*Primary Examiner* — Alexey Shmatov
*Assistant Examiner* — Robert Bejcek, II
(74) *Attorney, Agent, or Firm* — Finnegan, Henderson, Farabow, Garrett & Dunner, LLP

(57) ABSTRACT

This disclosure relates to system and method for generating an optimized result set based on vector based relative importance measure (VRIM). In one embodiment, the method comprises determining a vector representation for each of a plurality of input keywords extracted from an input query, and determining a plurality of representative keywords corresponding to the plurality of input keywords from a keyword database based on the vector representation for each of the plurality of input keywords and a vector representation for each of a plurality of keywords in the keyword database. The method further comprises determining a score for a plurality of response candidates corresponding to the input query based on a relative importance score and a similarity score for each of the plurality of representative keywords present in the plurality of response candidates, and generating a result set from the plurality of response candidates based on the score.

20 Claims, 3 Drawing Sheets

(51) Int. Cl.
*G06N 5/04* (2006.01)
*G06N 5/02* (2006.01)

(56) References Cited

U.S. PATENT DOCUMENTS

| | | |
|---|---|---|
| 8,498,956 B2 | 7/2013 | Srinivasan et al. |
| 8,666,983 B2 | 3/2014 | Brill et al. |
| 2002/0178005 A1 | 11/2002 | Dusan et al. |
| 2003/0028448 A1* | 2/2003 | Joseph ................ G06Q 30/016 705/304 |
| 2010/0250523 A1 | 9/2010 | Jin et al. |
| 2011/0055192 A1 | 3/2011 | Tang et al. |
| 2013/0268551 A1 | 10/2013 | Nikankin |
| 2015/0006502 A1 | 1/2015 | Chang et al. |

\* cited by examiner

SYSTEM AND METHOD FOR GENERATING AN OPTIMIZED RESULT SET USING VECTOR BASED RELATIVE IMPORTANCE MEASURE

TECHNICAL FIELD

This disclosure relates generally to information retrieval, and more particularly to system and method for generating an optimized result set based on vector based relative importance measure (VRIM).

BACKGROUND

Information retrieval is an important aspect of increasingly digital world. Several techniques exist to access and retrieve information from digital data sources. Typically, the process of information retrieval of unstructured data is triggered by a natural language query submitted by a user and involves processing the submitted query, and retrieving results from one or more databases. The retrieved results are then displayed to the user. For example, in any ticketing solution such as helpline solution when the user logs a ticket he may be presented closest responses or solutions for his query. However, the text entered by the user towards his query in natural language may not exist anywhere in the pre-existing knowledge store. The existing techniques therefore need to understand the meaning of the query and provide appropriate solutions. Further, in many cases, the quality of the results provided by the existing techniques is poor and irrelevant with respect to the input query, which further confuses the users.

Typically, when a user inputs a query to find relevant solutions based on the entered query, different similarity measures are applied. For example, in helpline solutions or question-answer (QA) systems, responses to a query rely on different similarity measures to find the relevance of the query with information on helpline database or QA database. Most of the similarity measures use different word level matching techniques to identify the most relevant response. Existing word level matching techniques include bag of words based matching, N-gram matching, and similarity measures like cosine similarity, Jacardian similarity, etc. These techniques generally tend to give the most matching response from the database. Word based matching techniques tend to fail since relevance cannot be decided based on the number of similar words. N-gram based methods are computationally very expensive and fail when order of the words change.

Further, the information retrieval systems based on these techniques often lack mechanisms which enable the systems to prune the result set further and pick the most relevant response if it exists, or to take a decision not to respond if none of the responses in the database are relevant. Hence, these systems end up giving irrelevant response to input queries, which may be very annoying. This condition primarily arises as the above discussed similarity measures generally tend to weigh all words equally during the similarity matching stage. In other words, these systems do not have a way to understand the meaning of the entered query and work only at word levels. Additionally, a scoring mechanism to identify the relevance of an input query to different responses in the database is very complex since this mechanism decides whether or not to respond to the query. Current mechanisms therefore tend to cripple the systems performance, as very strict matching mechanisms may tend to make the system only return an exact match while lenient matching mechanisms may lead to the system to generalize the matching process and return irrelevant results.

SUMMARY

In one embodiment, a method for generating an optimized result set is disclosed. In one example, the method comprises determining a vector representation for each of a plurality of input keywords extracted from an input query. The method further comprises determining a plurality of representative keywords corresponding to the plurality of input keywords from a keyword database based on the vector representation for each of the plurality of input keywords and a vector representation for each of a plurality of keywords in the keyword database. The method further comprises determining a score for a plurality of response candidates corresponding to the input query based on a relative importance score and a similarity score for each of the plurality of representative keywords present in the plurality of response candidates. The method further comprises generating a result set from the plurality of response candidates based on the score.

In one embodiment, a system for generating an optimized result set is disclosed. In one example, the system comprises at least one processor and a memory communicatively coupled to the at least one processor. The memory stores processor-executable instructions, which, on execution, cause the processor to determine a vector representation for each of a plurality of input keywords extracted from an input query. The processor-executable instructions, on execution, further cause the processor to determine a plurality of representative keywords corresponding to the plurality of input keywords from a keyword database based on the vector representation for each of the plurality of input keywords and a vector representation for each of a plurality of keywords in the keyword database. The processor-executable instructions, on execution, further causes the processor to determine a score for a plurality of response candidates corresponding to the input query based on a relative importance score and a similarity score for each of the plurality of representative keywords present in the plurality of response candidates. The processor-executable instructions, on execution, further causes the processor to generate a result set from the plurality of response candidates based on the score.

In one embodiment, a non-transitory computer-readable medium storing computer-executable instructions for generating an optimized result set is disclosed. In one example, the stored instructions, when executed by a processor, cause the processor to perform operations comprising determining a vector representation for each of a plurality of input keywords extracted from an input query. The operations further comprise determining a plurality of representative keywords corresponding to the plurality of input keywords from a keyword database based on the vector representation for each of the plurality of input keywords and a vector representation for each of a plurality of keywords in the keyword database. The operations further comprise determining a score for a plurality of response candidates corresponding to the input query based on a relative importance score and a similarity score for each of the plurality of representative keywords present in the plurality of response candidates. The operations further comprise generating a result set from the plurality of response candidates based on the score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
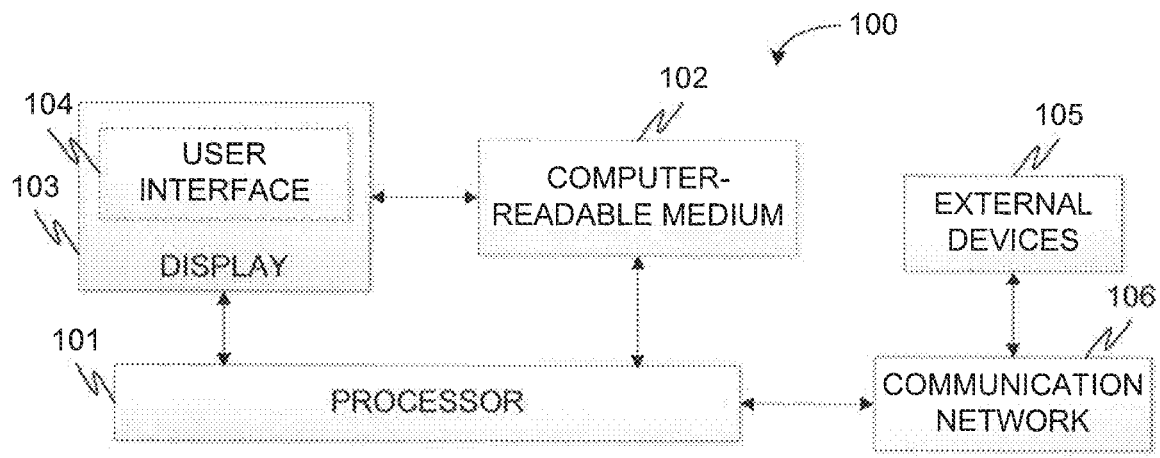
FIG. 1 is a block diagram of an exemplary system for generating an optimized result set in accordance with some embodiments of the present disclosure.

Referring now to FIG. 1, an exemplary system 100 for generating an optimized result set is illustrated in accordance with some embodiments of the present disclosure. In particular, the system 100 includes a response generating device (e.g., mobile phone, laptop, netbook, or any type of other computing devices) that determines a vector representation for each input keywords extracted from an input query, determines representative keywords corresponding to the input keywords based on the vector representation for each input keywords and a vector representation for each keywords in the keyword database, determines a score for multiple response candidates corresponding to the input query based on a relative importance score and a similarity score for each representative keywords present in the multiple response candidates, and generates a result set from the multiple response candidates based on the score. The system 100 comprises one or more processors 101, a computer-readable medium (e.g., a memory) 102, and a display 103. The computer-readable storage medium 102 stores instructions that, when executed by the one or more processors 101, cause the one or more processors 101 to generate an optimized result set in accordance with aspects of the present disclosure. The computer-readable storage medium 102 may also store various data (e.g., query data, training data, keywords, score, result set, etc.) that may be captured, processed, and/or required by the system 100. The system 100 interacts with a user via a user interface 104 accessible via the display 103. The system 100 may also interact with one or more external devices 105 over a communication network 106 for sending or receiving various data. The external devices 105 may include, but are not limited to, a remote server, a digital device, or another computing system.

Figure 2:
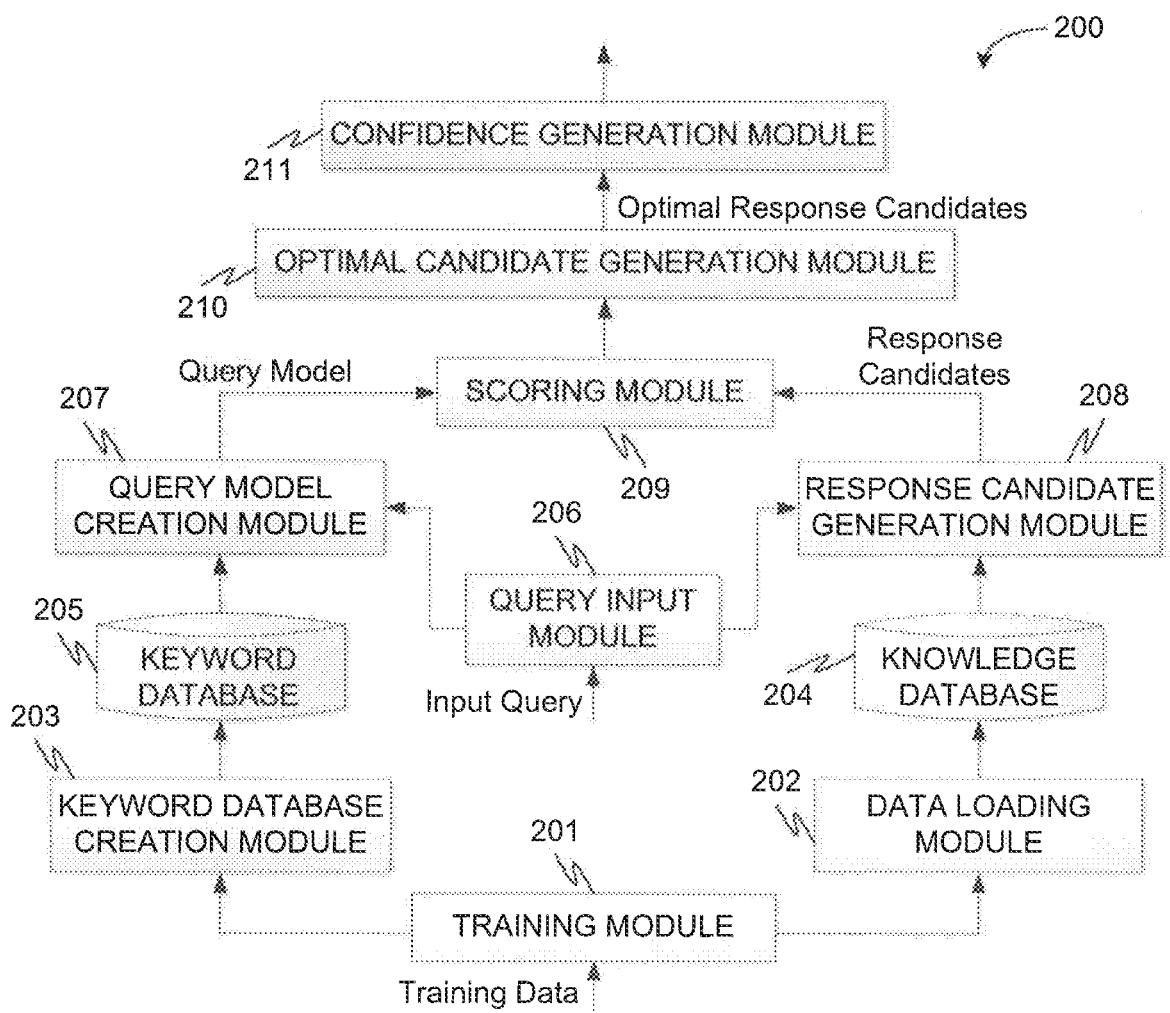
FIG. 2 is a functional block diagram of a response generating device in accordance with some embodiments of the present disclosure.

Referring now to FIG. 2, a functional block diagram of the response generating device 200 implemented by the system 100 of FIG. 1 is illustrated in accordance with some embodiments of the present disclosure. The response generating device 200 may include various engines or modules that perform various functions so as to provide a user with an optimized result set in response to an input query. In some embodiments, the response generating device 200 comprises a training module 201, a data loading module 202, a keyword database creation module 203, a knowledge database 204, a keyword database 205, a query input module 206, a query model creation module 207, a response candidate generation module 208, a scoring module 209, an optimal candidate generation module 210, and a confidence generation module 211. As will be appreciated by those skilled in the art, all such aforementioned modules 201-211 may be represented as a single module or a combination of different modules.

The training module 201 receives training data from a user and creates a corpus of keywords. In some embodiments, the training data may include generic data and/or domain specific data. The generic data may include world knowledge such as news clips, articles, blogs, and so forth. The domain specific data may include queries and corresponding responses, questions and corresponding answers, incident tickets and corresponding resolutions, and so forth with respect to a particular domain (e.g., banking domain, IT infrastructure domain, software product lifecycle domain, travel domain, and so forth). In some embodiments, the training module 201 creates the corpus of keywords by performing various text processing functions on the training data. In some embodiments, the text processing functions may involve removing stop words (e.g., punctuations, numbers, and so forth). Further, in some embodiments, the text processing functions may involve stemming where different forms of same words in the description (e.g., device/devices, utilization/utilizes/utilizing, etc.) may be represented by one word (e.g., device, utilization, etc.). It should be noted that various other text processing functions may also be employed by the training module 201 while creating the input corpus. Additionally, in some embodiments, the training module 201 creates the corpus of keywords by converting the unstructured data into structured data.

The training module 201 then creates a base model from the training data. The base model is trained from a combination of world and domain corpus and provides vector representations for all the keywords in the world and domain corpus. Alternatively, in some embodiments, the base model derives vector representations for all keywords in the domain corpus only. Additionally, the base model enables the response generating device 200 to determine vector representations for keywords in the input query. In some embodiments, the base model derives vector representation for a keyword based on one or more locations of the keyword in a contextual space in the training data using a machine learning algorithm. In some embodiments, a sliding window technique may be employed by the base model in which the context is analyzed based on a pre-defined number of words before and after the keyword for which the vector is being derived.

As will be appreciated by those skilled in the art, the training module 201 performs training initially while ingesting a supported set of data. The training is also repeated when any new data are ingested into the system. Thus, the response generating device 200 has all keywords with respect to a particular domain that are understood by it and each of the keywords is associated with a corresponding vector representation. The training module 201 provides the training data and/or the vector representations for the keywords to the data loading module 202 and the keyword database creation module 203.

The data loading module 202 loads the training data to the knowledge database 204. Additionally, the data loading module 202 updates the knowledge database 204 whenever it comes across any new data which is not present in the knowledge database 204. In some embodiments, the data loading module 202 loads only domain specific data to the knowledge database 204. Thus, the knowledge database 204 includes queries and corresponding responses, questions and corresponding answers, or incident tickets and corresponding resolutions with respect to a domain.

The keyword database creation module 203 creates the keyword database 205 based on the inputs received from the training module 201. Additionally, the keyword database creation module 203 updates the keyword database 205 whenever it comes across any new keywords which are not present in the keyword database 205. The keyword database 205 comprises all the keywords in the world and domain corpus along with the vector representation and a relative importance score for each keyword. Alternatively, in some embodiments, the keyword database comprises all the keywords in the domain corpus only along with the corresponding vector representations and relative importance scores.

The keyword database creation module 203 receives the keywords and their corresponding vector representations from the training module 201. Further, the keyword database creation module 203 computes the relative importance score for a keyword based on a frequency of occurrence of the keyword in the input corpus (i.e., the training corpus). In some embodiments, the relative importance score for a keyword is a information gain score (S) associated with the keyword in the input corpus, which is the log of the number of entries with the keyword divided by total number of entries, and is given as:

$$S = -\log_2(\text{Number of entries with the keyword/Total number of entries})$$

In some embodiments, the keyword database creation module 203 normalizes the relative importance score based on a minimum relative importance score and a maximum relative importance score for the input corpus. Thus, in some embodiments, the information gain score (S) of each keyword is normalized to a range of 1 so as to obtain the normalized information gain score (Sn) associated with each keyword as follows:

$$S_n = (S - S_{min})/(S_{max} - S_{min})$$

where $S_{min}$ is minimum information gain score and $S_{max}$ is maximum information gain score among all the keywords in the corpus.

Thus, the keyword database 205 stores the keywords, distributed vector representation associated with each keyword, and the normalized information gain score associated with each keyword. Additionally, in some embodiments, the keyword database creation module 203 uses Part-of Speech (PoS) tagging to categorize the keywords. The keyword database creation module 203 identifies Part-of Speech (e.g., nouns, verbs and adjectives) from each keyword in the input corpus and stores the Part of Speech (PoS) tags along with the corresponding keywords in the keyword database 205.

The query input module 206 receives a query from the user in natural language form. In some embodiments, the query input module 206 may perform various text processing functions on the input query for removing stop words (e.g., punctuations, numbers, and so forth) or for stemming. It should be noted that various other text processing functions may also be employed by the query input module 206. It then provides the input query to the query model creation module 207 and the response candidate generation module 208.

The query model creation module 207 tokenizes the input query i.e., it extracts input keywords from the input query. The query model creation module 207 then determines a vector representation for each of the input keywords using the base model created by the training module 201 during training phase. The query model creation module 207 then determines representative keywords corresponding to the input keywords from the keyword database 205 based on the vector representation for each input keyword and the vector representation for each keyword in the keyword database 205. In some embodiments, representative keywords are determined by comparing the vector associated with each input keyword against the vectors associated with the keywords in the keyword database 205 to identify the most similar vector entry in the keyword database 205. In other words, the query model creation module 207 determines if the representative keywords are suitable to represent the original input keywords or not. The query model creation module 207 first determines a similarity score between each of the input keywords and each of the keywords in the keyword database 205 based on the vector representation for each of the input keywords and the vector representation for each of the keywords. The query model creation module 207 then determines the representative keywords corresponding to the input keywords based on the similarity score and a pre-defined threshold value. It should be noted that, in some embodiments, the query model creation module 207 may apply a fuzzy inference system to determine the representative keywords. The query model creation module 207 then provides the representative keywords along with their similarity score and relative importance score to the scoring module 209. In some embodiments, the relative importance score is the normalized relative importance score as discussed above. Thus, the query model creation module 207 creates a vector based relative information measure (VRIM) based query module for the input query.

The response candidate generation module 208 generates potential response candidates from the knowledge database 204 for the given input query. In some embodiments, the potential response candidates are determined from a knowledge database 204 based on the input query using one or more search techniques (e.g., keyword based search, natural language search, similarity search, etc.). In an example, the response candidate generation module 208 may employ a keyword based search. The constituent keywords may be extracted from the input query. The entire response space from the knowledge database is also tokenized in same way. Each keyword in the input query may then be compared for presence in the potential responses. The responses having a score above a pre-defined threshold may be selected as potential response candidates. The response candidate generation module 208 then provides the potential response candidates to the scoring module 209.

The scoring module 209 determines the relevancy or the suitability of the potential response candidates with respect to the input query. In particular, the scoring module 209 determines a degree of similarity between the input query and the potential response candidates to the input query based on the vector based relative importance measure (VRIM). The scoring module compares all possible candidates with the VRIM based query models of the input query to validate the degree of information captured by the response candidates. In some embodiments, the scoring module 209 determines a score or a VRIM score for each of the potential response candidates with respect to the input query based on the relative importance score and the similarity score for one or more representative keywords present in the each of the potential response candidates. The score for each response candidate is determined as follows:

Score=Σ(vector similarity score×relative importance score) for each representative keywords present in the response candidate Further, in some embodiments, the query model creation module 207 or the scoring module 209 may determine a normalized relative importance score for each of the representative keywords with respect to the input query. In other words, relative importance score for each of the representative keywords may be normalized based on a sum of relative importance scores for the input keywords. Further, the scoring module 209 determines the score based on the normalized relative importance score for each of the plurality of representative keywords. Thus, the scoring module 209 maximizes the relative information score for each representative keyword with respect to the input query while penalizing if the representative keyword is a partial match to the input keyword.

The optimal candidate generation module 210 generates a result set comprising none or at least one response candidates from the potential response candidates based on the score. In some embodiments, the optimal candidate generation module 210 selects optimal response candidates (i.e., relevant response candidates) from the potential response candidates based on the score and a pre-defined threshold value. In other words, optimal candidate generation module 210 determines if one or more response candidates from the potential response candidates is suitable to represent the input query or not. Further, the confidence generation module 211 assigns a confidence level to each of the optimal response candidates. In some embodiments, the confidence level is determined using a fuzzy inference system. In some embodiments, the fuzzy inference system may determine the confidence level based on the score and a number of input keywords substituted by the representative keywords. For example, if the score is high and the number of words substituted is low then the confidence level is high. Similarly, if the score is low and the number of words substituted is high then the confidence level is low. In particular, the fuzzy inference system may determine the confidence level based on a membership function for a percentage of information dilution (1-score provided by the scoring module), a membership function for a percentage of keywords substituted, a membership function for the confidence score, and a correlation between the three membership functions.

By way of an example, the response generating device 200 generates base level parameters and initializes the system using the training data provided by the user during a training phase. The initialization of system involves creating the base model via the training module 201 for generating vector representation of all the keywords in the input corpus. The initialization of system further involves determining a normalized relative importance score for each keyword based on a frequency of occurrence of the keyword in the input corpus via the keyword database creation module 203.

For example, in some embodiments, sample illustration for determining the normalized relative importance score is provided in Table A below.

TABLE A

Training Data has 3 entries as follows:

(i) Blackberry is not working
(ii) Need to fix blackberry
(iii) Iphone not working
    After doing POS tagging, keywords and number of occurrences are as follows:

(i) Blackberry (Number of entries having keyword 'Blackberry' is 2)
(ii) Working (Number of entries having keyword 'Working' is 2)
(iii) Fix (Number of entries having keyword 'Fix' is 1)
(iv) Iphone (Number of entries having keyword 'Iphone' is 1)
    Computation of information gain scores (S) for above keywords are as follows:

(i) $-\log_2 (2/3) = -0.176$
(ii) $-\log_2 (2/3) = -0.176$
(iii) $-\log_2 (1/3) = -0.477$
(iv) $-\log_2 (1/3) = -0.477$
    Computation of normalized information gain scores ($S_n$) for above keywords are as follows:

(i) $-\log_2 (2/3) = -0.13476$
(ii) $-\log_2 (2/3) = -0.13476$
(iii) $-\log_2 (1/3) = -0.3507$
(iv) $-\log_2 (1/3) = -0.3507$ The initialization of system further involves creating the knowledge database 204 via the data loading module 202. The knowledge database 204 includes response candidates (e.g., incident tickets, ticket description, resolution, etc.). The initialization of system further involves creating a keyword database 205 via the keyword database creation module 203. The keyword database includes the keywords, their respective vector representations, and their normalized relative importance scores. For example, in some embodiments, sample illustration of a representation of the keyword database is provided in Table B below. The words in the keyword column are the keywords that appear in the domain corpus. The vector representation is provided by the base model created during initialization. The normalized relative importance score is determined by the keyword database creation module 203 during initialization as discussed in Table A above.

TABLE B

| Keywords | Vector Representation | Normalized Relative Importance Score |
|---|---|---|
| Desktop | [0.5, 0.8, 0.9] | 0.2 |
| Laptop | [0.5, 0.83, 0.9] | 0.2 |
| Error | [0.49, 0.2, 0.05] | 0.15 |
| Bluescreen | [0.2, 0.7, 0.1] | 0.25 |
| Network | [0.6, 0.9, 0.8] | 0.025 |
| Cable | [0.65, 0.91, 0.69] | 0.025 |
| Crash | [0.4, 0.19, 0.09] | 0.15 |

In operation, the response generating device 200 receives an input query from the user in natural language form via the query input module 206. The response generating device 200 then determines vector representations for input keywords in the input query using the base model via the query model creation module 207 in conjunction with the query input module 206. The response generating device 200 further determines representative keywords corresponding to the input keywords along with corresponding similarity scores and the relative importance scores via the query model creation module 207 in conjunction with the keyword database 205. The response generating device 200 further derives a VRIM based query model for the input query via the query model creation module 207. The relative importance scores for the input keywords in the VRIM based query model are normalized such that they sum up to 1. The normalized relative importance score for the input keywords are also assigned to corresponding representative keywords in the VRIM based query model. For example, in some embodiments, sample illustration of a VRIM based query model created for the input query—"Bluescreen error on laptop" is provided in Table C below.

TABLE C

| Keywords | Validity | Relative Importance Score | Normalized Relative Importance Score |
|---|---|---|---|
| Bluescreen | Valid Token | 0.25 | 0.25/(0.25 + 0.15 + 0.2) = 0.41 |
| Error | Valid Token | 0.15 | 0.15/(0.25 + 0.15 + 0.2) = 0.2499 |
| On | Invalid Token | 0 | 0 |
| Laptop | Valid Token | 0.2 | 0.2/(0.25 + 0.15 + 0.2) = 0.33 |

Here, normalized relative importance score of a given keyword (e.g., 'Bluescreen') is determined by acquiring the relative importance scores of all the valid keywords in the input query from the keyword database illustrated in Table B above, and then dividing the relative importance scores of the given keyword (e.g., 'Bluescreen') with the sum of relative importance scores of all the valid keywords. Further, sample illustration of a representative keyword for the keyword 'laptop' listed in Table C is provided in Table D below.

TABLE D

| Keywords | Representative Keyword | Vector Similarity Score |
|---|---|---|
| Laptop | Desktop | 0.99 |

Additionally, the response generating device 200 determines potential response candidates from the knowledge database 204 for the given input query via the response candidate generation module 208. For example, potential response candidates may be determined using any keyword search technique (e.g., standard cosine similarity search). The response generating device 200 then determines VRIM score for each of the potential response candidates based on the VRIM based query model via the scoring module. For example, in some embodiments, sample illustration of scoring the potential response candidates is provided in Table E below.

TABLE E

| Potential Response Candidates | Score Calculation | Score |
|---|---|---|
| Bluescreen Error on Desktop | (1 × 0.41) + (1 × 0.2499) + (.99 × 0.33) | 0.9865 |
| Laptop Port Error in Connection | (1 × 0.2499) + (1 × 0.33) | 0.5799 |
| WiFi Modem Not Working Error in Connection | (1 × 0.2499) | 0.2499 |
| Proxy Error | (1 × 0.2499) | 0.2499 |
| Generating Error 404 on Accessing Webpage | (1 × 0.2499) | 0.2499 |

The 'Proxy Error' gets a score of 0.2499 since only 'Error' matches the input keywords or representative keywords while 'Bluescreen error on laptop' gets a score of 0.9865 since all the keywords matches the input keywords or representative keywords. Here, the incident tickets in the above table are considered as potential response candidates. As will be appreciated by those skilled in the art, the techniques described herein is equally applicable for incident ticket resolutions as the potential response candidates.

Further, the response generating device 200 identifies optimal response candidates from the potential response candidates based on the score along with a corresponding confidence level using fuzzy inference system. For example, in some embodiments, sample illustration of inference table of fuzzy inference system is provided in Table F below.

TABLE F

| | | Percentage of Information Dilution (1-Score) | |
|---|---|---|---|
| | Low | Medium | High |
| Percentage of Words Substituted | Low | High | Medium | Low |
| | Medium | High | Medium | Low |
| | High | Medium | Low | Low |

Further, sample illustration of the potential response candidates along with corresponding scores and confidence level is provided in Table G below.

TABLE G

| Potential Response Candidates | Percentage of Words Substitutions | Score | Confidence |
|---|---|---|---|
| Bluescreen Error on Desktop | 1/3 = 0.33 (Medium) | 0.9865 (High) | High |
| Laptop Port Error in Connection | 0/2 = 0 (Low) | 0.5799 (Medium) | Medium |
| WiFi Modem Not Working Error in Connection | 0/1 = 0 (Low) | 0.2499 (Low) | Low |
| Proxy Error | 0/1 = 0 (Low) | 0.2499 (Low) | Low |
| Generating Error 404 on Accessing Webpage | 0/1 = 0 (Low) | 0.2499 (Low) | Low |

Thus, the response candidate with the highest score and the highest confidence level is presented to the user as the most relevant response. As will be appreciated, all the irrelevant responses are left out even when they showed up during keyword based search technique.

As will be appreciated by one skilled in the art, a variety of processes may be employed for generating an optimized result set. For example, the exemplary system 100 may generate the optimized result by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
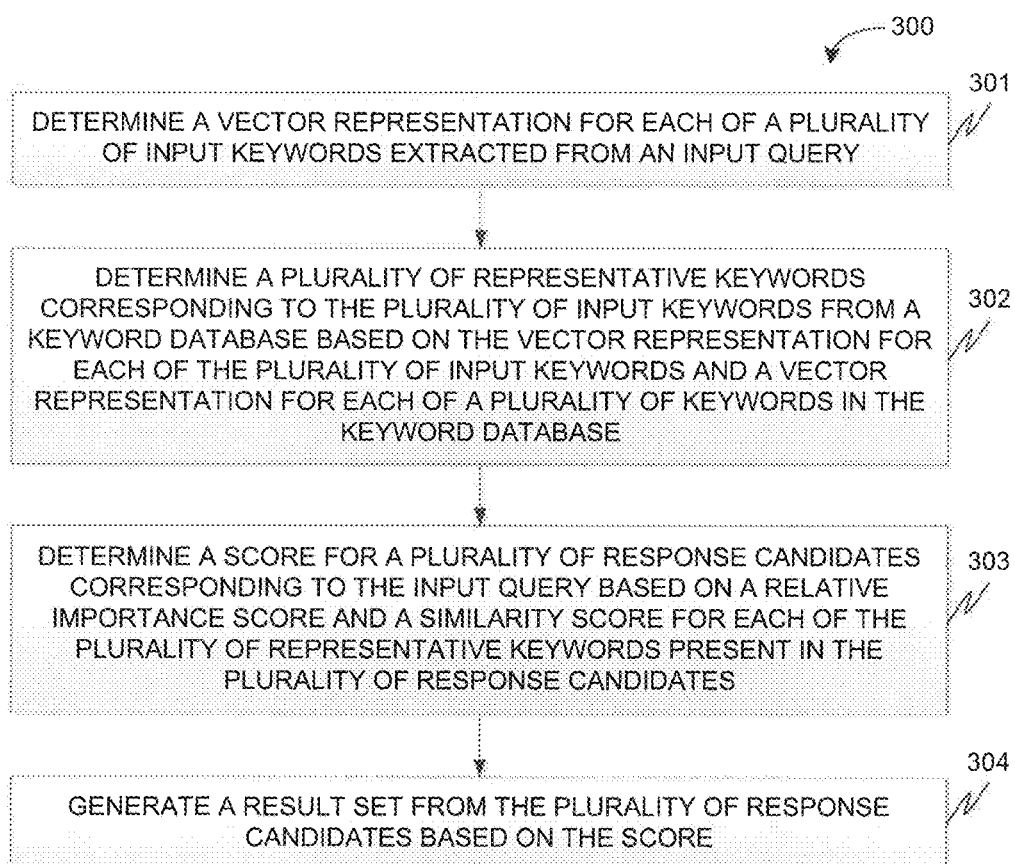
FIG. 3 is a flow diagram of an exemplary process for generating an optimized result set in accordance with some embodiments of the present disclosure.

For example, referring now to FIG. 3, exemplary control logic 300 for generating an optimized result set via a system, such as system 100, is depicted via a flowchart in accordance with some embodiments of the present disclosure. As illustrated in the flowchart, the control logic 300 includes the steps of determining a vector representation for each of a plurality of input keywords extracted from an input query at step 301, and determining a plurality of representative keywords corresponding to the plurality of input keywords from a keyword database based on the vector representation for each of the plurality of input keywords and a vector representation for each of a plurality of keywords in the keyword database at step 302. The control logic 300 further includes the steps of determining a score for a plurality of response candidates corresponding to the input query based on a relative importance score and a similarity score for each of the plurality of representative keywords present in the plurality of response candidates at step 303, and generating a result set from the plurality of response candidates based on the score at step 304. In some embodiments, the control logic 300 may further include the step of creating the keyword database during a training phase. The keyword database comprises the plurality of keywords, the vector representation for each of the plurality of keywords, and a relative importance score for each of the plurality of keywords. In some embodiments, the control logic 300 may further include the step of determining the plurality of response candidates from a knowledge database based on the input query using one or more search algorithm. The knowledge database includes at least one of a domain data and a generic data.

In some embodiments, the vector representation for a keyword is determined based on one or more locations of the keyword in a contextual space in a training data using machine learning algorithm. Additionally, in some embodiments, the relative importance score for a keyword is determined based on a frequency of occurrence of the keyword in a training data. The training data comprises at least one of a domain data and a generic data. In some embodiments, the relative importance score is normalized based on a minimum relative importance score and a maximum relative importance score for the training data.

In some embodiments, the control logic 300 may further include the step of determining a normalized relative importance score for each of the plurality of representative keywords with respect to the input query based on a sum of relative importance scores for the plurality of input keywords. In such embodiments, determining the score at step 303 comprises determining the score based on the normalized relative importance score for each of the plurality of representative keywords.

Further, in some embodiments, determining the plurality of representative keywords at step 302 comprises determining a similarity score between each of the plurality of input keywords and each of the plurality of keywords in the keyword database based on the vector representation for each of the plurality of input keywords and the vector representation for each of the plurality of keywords, and determining the plurality of representative keywords corresponding to the plurality of input keywords based on the similarity score. In some embodiments, the result set comprises one or more optimal response candidates along with a corresponding confidence level. In some embodiments, the confidence level is determined using a fuzzy inference system based on the score and a number of input keywords substituted by the representative keywords.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 4:
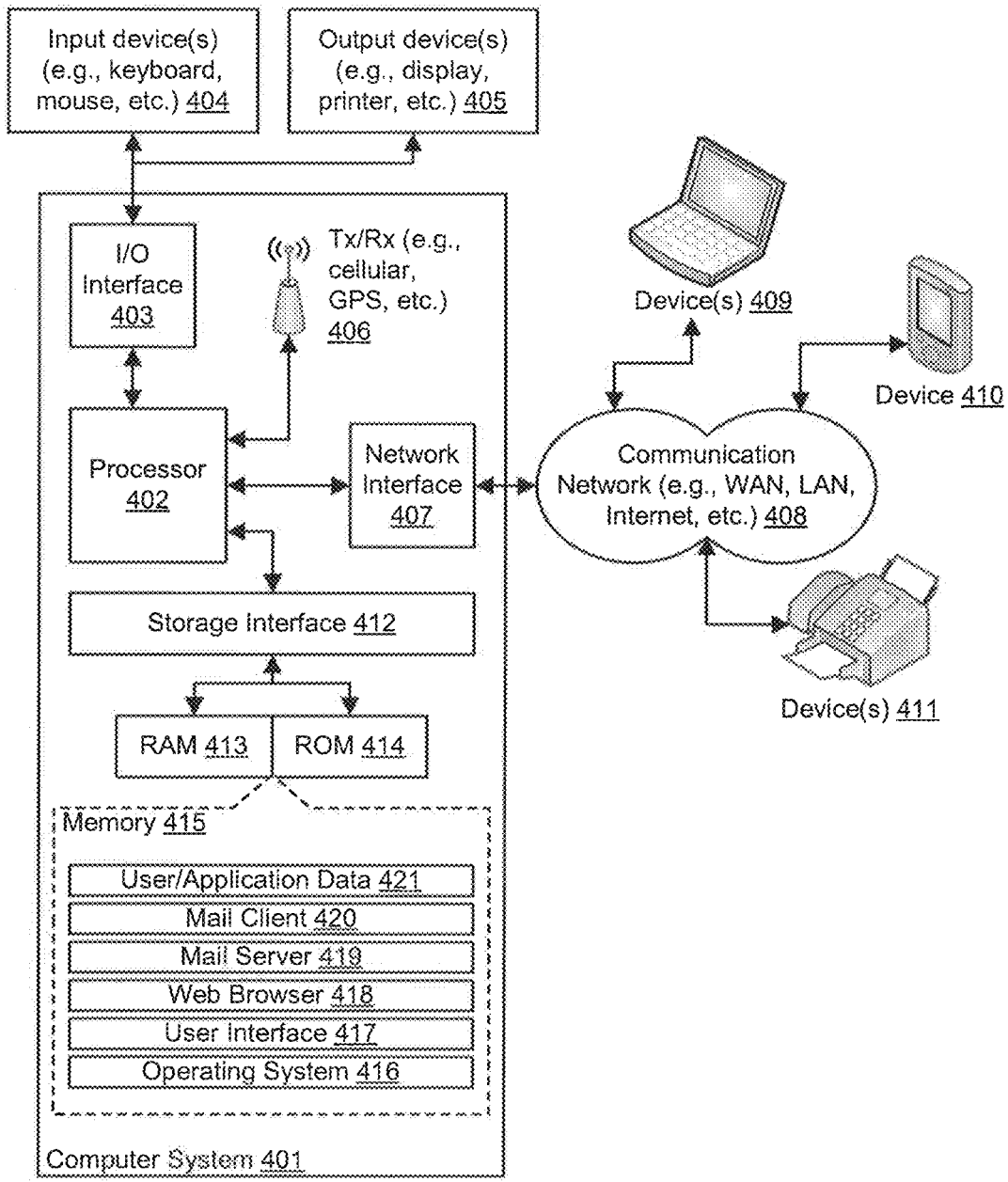
FIG. 4 is a block diagram of an exemplary computer system for implementing embodiments consistent with the present disclosure.

Referring now to FIG. 4, a block diagram of an exemplary computer system 401 for implementing embodiments consistent with the present disclosure is illustrated. Variations of computer system 401 may be used for implementing system 100 for generating an optimized result set. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C #, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., input query, training data, keywords, representative keywords, vector representation of keywords, relative importance scores of keywords, response candidates, optimal response candidates, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provides an optimized and relevant result set in response to an input query. The technique provides reliable and accurate result set while eliminating or limiting irrelevant results by employing vector based relative importance measure (VRIM) which is a measure of the vector based relative information captured by the input query in relation to potential response candidates. The techniques described in the various embodiments discussed above dynamically adapt the VRIM scores based on the input query as well as the knowledge base and pick the most relevant response based on the VRIM scores. Further, the techniques may provide no responses if none of the responses are relevant.

It should be noted that, the techniques described in the various embodiments discussed above identify semantic meaning of the input query and perform search based on understanding of the semantic meaning. The techniques capture semantic similarity by performing semantic vector match using distributed vectors. In other words, the techniques look at the semantic similarity of informative terms while generating an answer. Additionally, the techniques described in the various embodiments discussed above determine and assign a level of confidence with each result using fuzzy inference system, and automatically determine results that are to be presented to the user based on the confidence level. Further, the techniques described in the various embodiments discussed above may be employed for unstructured data as well as for structured data. Moreover, the techniques described in the various embodiments discussed above may be easily implemented in and/or integrated with existing information retrieval systems so as to generate and provide an optimized result set.

The specification has described system and method for generating an optimized result set. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for generating an optimized result set, the method comprising:
   determining, by a response generating device, a vector representation for each of a plurality of input keywords extracted from an input query, wherein the vector representation for each of the plurality of input keywords is derived based on one or more locations of each of the plurality of input keywords in a contextual space in training data using a machine learning algorithm;
   determining, by the response generating device, a plurality of representative keywords corresponding to the plurality of input keywords from a keyword database based on the vector representation for each of the plurality of input keywords and a vector representation for each of a plurality of keywords in the keyword database;
   determining, by the response generating device, a score for a plurality of response candidates corresponding to the input query based on a relative importance score and a similarity score for each of the plurality of representative keywords present in the plurality of response candidates, wherein the relative importance score for a keyword is information gain score (S) associated with the keyword in the input query, which is log of number of entries with the keyword divided by total number of entries; and
   generating, by the response generating device, a result set from the plurality of response candidates based on the score.

2. The method of claim 1, further comprising creating the keyword database during a training phase, wherein the keyword database comprises the plurality of keywords, the vector representation for each of the plurality of keywords, and a relative importance score for each of the plurality of keywords.

3. The method of claim 1, wherein the vector representation for a keyword is determined based on one or more locations of the keyword in a contextual space in a training data using a machine learning algorithm, wherein the training data comprises at least one of a domain data and a generic data.

4. The method of claim 1, wherein the relative importance score for a keyword is determined based on a frequency of occurrence of the keyword in a training data, wherein the training data comprises at least one of a domain data and a generic data.

5. The method of claim 4, wherein the relative importance score is normalized based on a minimum relative importance score and a maximum relative importance score for the training data.

6. The method of claim 1, further comprising determining a normalized relative importance score for each of the plurality of representative keywords with respect to the input query based on a sum of relative importance scores for the plurality of input keywords, wherein determining the score comprises determining the score based on the normalized relative importance score for each of the plurality of representative keywords.

7. The method of claim 1, wherein determining the plurality of representative keywords comprises:
   determining the similarity score between each of the plurality of input keywords and each of the plurality of keywords in the keyword database based on the vector representation for each of the plurality of input keywords and the vector representation for each of the plurality of keywords; and
   determining the plurality of representative keywords corresponding to the plurality of input keywords based on the similarity score.

8. The method of claim 1, further comprising determining the plurality of response candidates from a knowledge database based on the input query using one or more search algorithm, and wherein the knowledge database comprises at least one of a domain data and a generic data.

9. The method of claim 1, wherein the result set comprises one or more optimal response candidates along with a corresponding confidence level.

10. The method of claim 9, wherein the confidence level is determined using a fuzzy inference system based on the score and a number of input keywords substituted by the representative keywords.

11. A system for generating an optimized result set, the system comprising:
at least one processor; and
a computer-readable medium storing instructions that, when executed by the at least one processor, cause the at least one processor to perform operations comprising:
determining a vector representation for each of a plurality of input keywords extracted from an input query, wherein the vector representation for each of the plurality of input keywords is derived based on one or more locations of each of the plurality of input keywords in a contextual space in training data using a machine learning algorithm;
determining a plurality of representative keywords corresponding to the plurality of input keywords from a keyword database based on the vector representation for each of the plurality of input keywords and a vector representation for each of a plurality of keywords in the keyword database;
determining a score for a plurality of response candidates corresponding to the input query based on a relative importance score and a similarity score for each of the plurality of representative keywords present in the plurality of response candidates, wherein the relative importance score for a keyword is information gain score (S) associated with the keyword in the input query, which is log of number of entries with the keyword divided by total number of entries; and
generating a result set from the plurality of response candidates based on the score.

12. The system of claim 11, wherein the operations further comprise creating the keyword database during a training phase, wherein the keyword database comprises the plurality of keywords, the vector representation for each of the plurality of keywords, and a relative importance score for each of the plurality of keywords.

13. The system of claim 11, wherein the vector representation for a keyword is determined based on one or more locations of the keyword in a contextual space in a training data using a machine learning algorithm, wherein the training data comprises at least one of a domain data and a generic data.

14. The system of claim 11, wherein the relative importance score for a keyword is determined based on a frequency of occurrence of the keyword in a training data, wherein the training data comprises at least one of a domain data and a generic data, and wherein the relative importance score is normalized based on a minimum relative importance score and a maximum relative importance score for the training data.

15. The system of claim 11, wherein the operations further comprise determining a normalized relative importance score for each of the plurality of representative keywords with respect to the input query based on a sum of relative importance scores for the plurality of input keywords, and wherein determining the score comprises determining the score based on the normalized relative importance score for each of the plurality of representative keywords.

16. The system of claim 11, wherein determining the plurality of representative keywords comprises:
determining the similarity score between each of the plurality of input keywords and each of the plurality of keywords in the keyword database based on the vector representation for each of the plurality of input keywords and the vector representation for each of the plurality of keywords; and
determining the plurality of representative keywords corresponding to the plurality of input keywords based on the similarity score.

17. The system of claim 11, wherein the operations further comprise determining the plurality of response candidates from a knowledge database based on the input query using one or more search algorithm, and wherein the knowledge database comprises at least one of a domain data and a generic data.

18. The system of claim 11, wherein the result set comprises one or more optimal response candidates along with a corresponding confidence level, and wherein the confidence level is determined using a fuzzy inference system based on the score and a number of input keywords substituted by the representative keywords.

19. A non-transitory computer-readable medium storing computer-executable instructions for:
determining a vector representation for each of a plurality of input keywords extracted from an input query, wherein the vector representation for each of the plurality of input keywords is derived based on one or more locations of each of the plurality of input keywords in a contextual space in training data using a machine learning algorithm;
determining a plurality of representative keywords corresponding to the plurality of input keywords from a keyword database based on the vector representation for each of the plurality of input keywords and a vector representation for each of a plurality of keywords in the keyword database;
determining a score for a plurality of response candidates corresponding to the input query based on a relative importance score and a similarity score for each of the plurality of representative keywords present in the plurality of response candidates, wherein the relative importance score for a keyword is information gain score (S) associated with the keyword in the input query, which is log of number of entries with the keyword divided by total number of entries; and
generating a result set from the plurality of response candidates based on the score.

20. The non-transitory computer-readable medium of claim 19, further storing computer-executable instructions for creating the keyword database during a training phase, wherein the keyword database comprises the plurality of keywords, the vector representation for each of the plurality of keywords, and a relative importance score for each of the plurality of keywords, wherein the vector representation for a keyword is determined based on one or more locations of the keyword in a contextual space in a training data using a machine learning algorithm, wherein the relative importance score for a keyword is determined based on a frequency of occurrence of the keyword in a training data, and wherein the training data comprises at least one of a domain data and a generic data.

* * * * *